(12) United States Patent
Watanabe et al.

(10) Patent No.: US 11,103,753 B2
(45) Date of Patent: Aug. 31, 2021

(54) MULTI-PIECE SOLID GOLF BALL

(71) Applicant: Bridgestone Sports Co., Ltd., Tokyo (JP)

(72) Inventors: Hideo Watanabe, Saitamaken (JP); Atsushi Komatsu, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 17/024,920

(22) Filed: Sep. 18, 2020

(65) Prior Publication Data

US 2021/0106879 A1 Apr. 15, 2021

(30) Foreign Application Priority Data

Oct. 15, 2019 (JP) .............................. JP2019-188476

(51) Int. Cl.
| | |
|---|---|
| *A63B 37/06* | (2006.01) |
| *A63B 37/00* | (2006.01) |
| *C08L 23/22* | (2006.01) |
| *C08K 5/098* | (2006.01) |
| *C08K 5/053* | (2006.01) |

(52) U.S. Cl.
CPC .... *A63B 37/00922* (2020.08); *A63B 37/0031* (2013.01); *A63B 37/0043* (2013.01); *A63B 37/0062* (2013.01); *C08L 23/22* (2013.01); *A63B 37/0075* (2013.01); *C08K 5/053* (2013.01); *C08K 5/098* (2013.01)

(58) Field of Classification Search
CPC .................................................. A63B 37/0063
USPC .......................................................... 473/373
See application file for complete search history.

(56) References Cited

U.S. PATENT DOCUMENTS

| | | | | |
|---|---|---|---|---|
| 2010/0273575 | A1* | 10/2010 | Watanabe .......... | A63B 37/0076 473/373 |
| 2010/0298067 | A1 | 11/2010 | Watanabe | |
| 2011/0143861 | A1 | 6/2011 | Watanabe et al. | |
| 2013/0029787 | A1* | 1/2013 | Watanabe .......... | A63B 37/0033 473/373 |
| 2013/0296076 | A1* | 11/2013 | Kimura .............. | A63B 37/0003 473/374 |
| 2014/0100059 | A1* | 4/2014 | Kimura .............. | A63B 37/0031 473/374 |
| 2014/0357408 | A1* | 12/2014 | Shindo ............... | A63B 37/0051 473/372 |

(Continued)

FOREIGN PATENT DOCUMENTS

| | | |
|---|---|---|
| JP | 2010-269146 A | 12/2010 |
| JP | 2011-120898 A | 6/2011 |

(Continued)

*Primary Examiner* — Raeann Gorden
(74) *Attorney, Agent, or Firm* — Sughrue Mion, PLLC

(57) ABSTRACT

In a golf ball having a core, an intermediate layer and a cover, the core is formed primarily of a base rubber, has a diameter set in a specific range and has a specially designed internal hardness profile, the intermediate layer and the cover are each formed of resin materials, and the surface hardness of the ball is higher than the surface hardness of the intermediate layer-encased sphere. This ball achieves a satisfactory distance on full shots with a driver and with long and middle irons, provides a good spin performance on approach shots, and has a durability to repeated impact and a scuff resistance that are both excellent.

6 Claims, 2 Drawing Sheets

(56) References Cited

U.S. PATENT DOCUMENTS

| | | | |
|---|---|---|---|
| 2015/0182808 A1* | 7/2015 | Tachibana | A63B 37/0092 |
| | | | 473/376 |
| 2016/0175660 A1 | 6/2016 | Watanabe et al. | |
| 2017/0113100 A1 | 4/2017 | Watanabe et al. | |
| 2017/0189765 A1* | 7/2017 | Watanabe | A63B 37/0068 |

FOREIGN PATENT DOCUMENTS

| | | | |
|---|---|---|---|
| JP | 2012-223286 A | 11/2012 |
| JP | 2013-230362 A | 11/2013 |
| JP | 2013-244165 A | 12/2013 |
| JP | 2016-112308 A | 6/2016 |
| JP | 2017-079905 A | 5/2017 |
| JP | 2018-068983 A | 5/2018 |
| JP | 2018-094211 A | 6/2018 |

* cited by examiner

MULTI-PIECE SOLID GOLF BALL

CROSS-REFERENCE TO RELATED APPLICATION

This non-provisional application claims priority under 35 U.S.C. § 119(a) on Patent Application No. 2019-188476 filed in Japan on Oct. 15, 2019, the entire contents of which are hereby incorporated by reference.

TECHNICAL FIELD

The present invention relates to a multi-piece solid golf ball having at least three layers, including a core, an intermediate layer and a cover.

BACKGROUND ART

Most golf balls lately are either two-piece solid golf balls or three-piece solid golf balls. These golf balls generally have a structure in which a single-layer or multilayer cover made of various resin materials encases a core made of a rubber composition. The core accounts for most of the golf ball volume and exerts a large influence on ball properties such as rebound, feel at impact and durability. In a number of recent disclosures in the art, the cross-sectional hardness of the core is suitably adjusted so as to achieve a distinctive core hardness gradient, thereby optimizing the spin properties of the ball on full shots with a driver or an iron and enabling the ball to travel an increased distance.

Methods for adjusting the cross-sectional hardness of the core include, for example, suitably adjusting the compounding ingredients in the core rubber composition and the vulcanization temperature and time. For example, JP-A 2016-112308 (and the corresponding U.S. Published Patent Application No. 2016/0175660), JP-A 2017-79905 (and the corresponding U.S. Published Patent Application No. 2017/0113100) and JP-A 2013-230362 (and the corresponding U.S. Published Patent Application No. 2013/0296076) describe art that includes water in the core-forming rubber composition. Another approach, with regard to the compounding ingredients in the core-forming rubber composition, involves selection of the types of co-crosslinking agent and organic peroxide and adjustment of their contents. JP-A 2013-244165 describes art that provides the overall core with a given cross-sectional hardness profile by fabricating the core as two layers and also using specific co-crosslinking agents.

In addition, JP-A 2018-68983 and JP-A 2018-94211 describe art that imparts a distinctive core hardness gradient by forming the core such that the hardness near the core surface is relatively low. JP-A 2012-223286, JP-A 2011-120898 (and the corresponding U.S. Published Patent Application No. 2011/0143861) and JP-A 2010-269146 (and the corresponding U.S. Published Patent Application No. 2010/0298067) also describe art that provides distinctive core hardness profiles.

However, when such prior-art golf balls are used by professional golfers and skilled amateur golfers, even if a good distance can be achieved on shots with a driver (W #1), these balls are often inadequate in terms of other ball properties, such as the distance on full shots with an iron. Moreover, among professionals and skilled amateur golfers, the spin performance on approach shots is an important factor for increasing the short game playability, and so they require an optimal spin rate on approach shots. In addition, such players also require that a high performance with regard to other ball properties as well, including durability and scuff resistance, be maintained. Hence, there exists a desire for the development of a hardness design for the entire ball which takes into account not only the core hardness profile but also, for example, the hardness relationships of the intermediate layer and the cover.

SUMMARY OF THE INVENTION

It is therefore an object of the present invention to provide a multi-piece solid golf ball which achieves a satisfactory distance on full shots not only with a driver (W #1) but also with long and middle irons, enables a good spin performance to be obtained on approach shots, and moreover has an excellent durability to repeated impact and an excellent scuff resistance.

As a result of extensive investigations, we have found that, in a golf ball having a core, an intermediate layer and a cover, by forming the core primarily of a base rubber and setting the core diameter to at least 32 mm, by forming the intermediate layer and the cover each of a resin material and, with regard to the interior hardness of the core—especially the core center hardness, the hardnesses at positions located at 2 mm intervals from the core center out to 16 mm and the core surface hardness, by having differences between these hardnesses be at or below a specific value, and moreover by making the core hardness gradient free of abrupt changes and having the hardness gradient near the core surface not be higher than a given level, by designing the core such that the hardness difference between the core center and the core surface is at or above a certain value and by having the ball surface hardness be lower than the surface hardness of the intermediate layer-encased sphere, a lower spin rate can be achieved on full shots with a driver (W #1) and with irons, enabling an excellent distance performance to be achieved that is capable of satisfying professional golfers and skilled amateur golfers, an excellent spin performance is exhibited in the short game and an excellent durability to repeated impact and an excellent scuff resistance are ensured. This golf ball is thus ideal as a golf ball for professional golfers and skilled amateurs.

Accordingly, the invention provides a multi-piece solid golf ball having a core, an intermediate layer and a cover, wherein the core is formed primarily of a base rubber and has a diameter of at least 32 mm, the intermediate layer and the cover are each formed of a resin material, the core has an internal hardness which is such that, letting Cc be the Shore C hardness at a center of the core, C2 be the Shore C hardness at a position 2 mm from the core center, C4 be the Shore C hardness at a position 4 mm from the core center, C6 be the Shore C hardness at a position 6 mm from the core center, C8 be the Shore C hardness at a position 8 mm from the core center, C10 be the Shore C hardness at a position 10 mm from the core center, C12 be the Shore C hardness at a position 12 mm from the core center, C14 be the Shore C hardness at a position 14 mm from the core center, C16 be the Shore C hardness at a position 16 mm from the core center, Cs be the Shore C hardness at a surface of the core, Cs-3 be the Shore C hardness at a position 3 mm inside the core surface and Cm be the Shore C hardness at a position midway between the core surface and the core center, the values of C8−C6, C6−C4, C4−C2 and C2−Cc are all 4.0 or less and the values of C16−C14, C14−C12, C12−C10 and C10−C8 are all 5.5 or less, and which satisfies formulas (1), (2) and (3) below $$Cs-Cc \geq 22 \qquad (1)$$

$$(Cs-Cm)/(C4-Cc) \geq 4.0 \qquad (2)$$

$$Cs-Cs\text{-}3 \leq 5.0 \qquad (3);$$

and the sphere obtained by encasing the core with the intermediate layer (intermediate layer-encased sphere) has a Shore C surface hardness and the ball has a Shore C surface hardness which satisfy the following relationship:

surface hardness of ball<surface hardness of intermediate layer-encased sphere (4).

In a preferred embodiment of the multi-piece solid golf ball of the invention, the core internal hardness is such that, in the measured hardnesses obtained by measuring the Shore C hardness at 2 mm intervals outward from the core center but not measuring the hardness at a position 2 mm inside the surface, letting the differences between the adjoining measured hardnesses from the core center outward be respectively $A_0, A_1, A_2, A_3 \ldots$, these adjoining measured hardness differences in turn have differences therebetween, defined respectively as $A_1-A_0, A_2-A_1, A_3-A_2 \ldots$, which are all values of 3.5 or less.

In another preferred embodiment of the golf ball of the invention, the core consists of a single layer.

In yet another preferred embodiment, a coating layer is formed on a surface of the cover and, letting Hc be the Shore C hardness of the coating layer, the difference (Hc−Cc) between Hc and the Shore C hardness Cc at the core center is at least −12 and up to 20.

In still another preferred embodiment, the core is formed of a rubber composition which includes (a) a base rubber, (b) a co-crosslinking agent that is an α,γ-unsaturated carboxylic acid or a metal salt thereof or both, (c) a crosslinking initiator, and (d) a lower alcohol having a molecular weight of less than 200. The content of component (d) may be from 0.5 to 5 parts by weight per 100 parts by weight of the base rubber (a). Component (d) may be a monohydric, dihydric or trihydric alcohol and/or may be butanol, glycerol, ethylene glycol or propylene glycol.

Advantageous Effects of the Invention

The multi-piece solid golf ball of the invention can achieve a satisfactory distance on full shots not only with a driver (W #1) but also with long and middle irons, is capable of obtaining a good spin performance on approach shots, and moreover can ensure an excellent durability to repeated impact and scuff resistance. Such qualities make this ball highly useful as a golf ball for professional golfers and skilled amateurs.

BRIEF DESCRIPTION OF THE DIAGRAMS

DESCRIPTION OF THE PREFERRED EMBODIMENTS

The objects, features and advantages of the invention will become more apparent from the following detailed description taken in conjunction with the appended diagrams.

Figure 1:
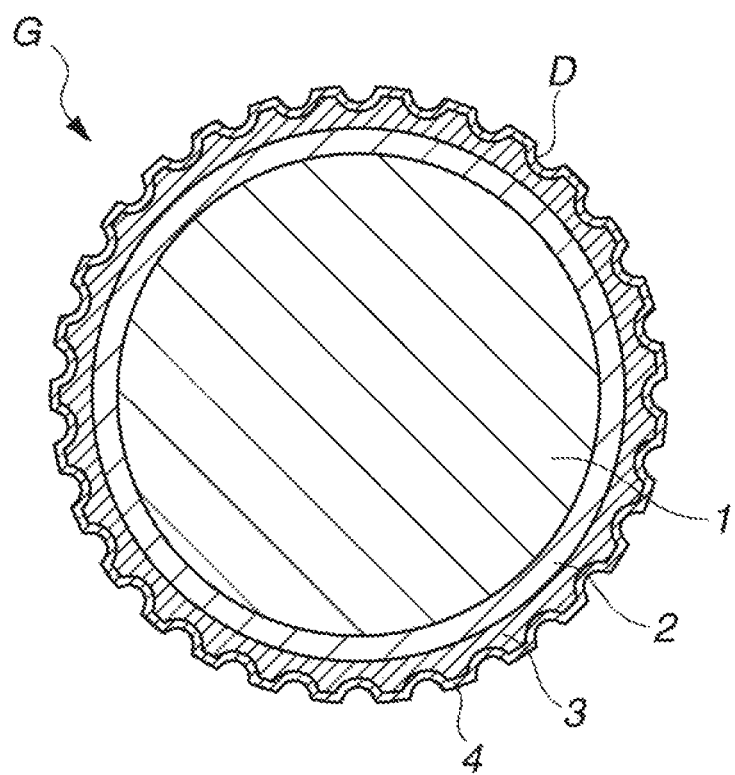
FIG. 1 is a schematic cross-sectional view of the multi-piece solid golf ball (three-piece structure) according to the invention.

Referring to FIG. 1, the multi-piece solid golf ball of the invention is a golf ball G having three or more pieces that include a core 1, an intermediate layer 2 encasing the core 1, and a cover 3 encasing the intermediate layer 2. Numerous dimples D are typically formed on the surface of the cover 3. A coating layer 4 is applied onto the surface of the cover 3. Apart from the coating layer 4, the cover 3 is positioned as the outermost layer in the layered structure of the golf ball. The core 1, intermediate layer 2 and cover 3 are not limited to a single layer; each may be formed of a plurality of two or more layers. From the standpoint of mass productivity, the core is preferably made of a single layer.

The core has a diameter of at least 32.0 mm. The diameter is preferably at least 34.0 mm, and more preferably at least 36.0 mm. The diameter upper limit is preferably not more than 39.7 mm, and more preferably not more than 38.7 mm. When the core diameter is too large, the durability to cracking on repeated impact may worsen, or the spin rate on full shots with a driver (W #1) or an iron may rise, as a result of which the desired distance may not be obtained. On the other hand, when the core diameter is too small, the spin rate on full shots may rise or the initial velocity on a shot may decrease, as a result of which a good distance may not be achieved.

The core has a deflection (mm) when compressed under a final load of 1,275 N (130 kgf) from an initial load of 98 N (10 kgf) which, although not particularly limited, is preferably at least 2.5 mm, more preferably at least 2.8 mm, and even more preferably at least 3.1 mm. The core deflection upper limit is preferably not more than 5.0 mm, more preferably not more than 4.6 mm, and even more preferably not more than 4.3 mm. When the core deflection is too small, i.e., when the core is too hard, the spin rate of the ball may rise excessively, resulting in a poor distance, or the feel at impact may be too hard. On the other hand, when the core deflection is too large, i.e., when the core is too soft, the ball rebound may be too low, resulting in a poor distance, the feel at impact may become too soft, or the durability to cracking on repeated impact may worsen.

The core is composed primarily of a rubber material. This is because when the core material is a resin, obtaining a smooth hardness profile at the core interior is difficult and so the subsequently described core hardness profile may not be satisfied.

The rubber material of the core is exemplified by a vulcanized rubber composition. This rubber composition is typically obtained by using a base rubber as the primary ingredient and compounding with this a co-crosslinking agent, an organic peroxide, an inert filler, an organosulfur compound and the like. In this invention, it is preferable to form a rubber composition containing ingredients (a) to (d) below:

(a) a base rubber,
(b) a co-crosslinking agent which is an α,β-unsaturated carboxylic acid and/or a metal salt thereof,
(c) a crosslinking initiator, and
(d) a lower alcohol having a molecular weight below 200.

Ingredients other than components (a) to (d), such as sulfur, organosulfur compounds, fillers and antioxidants, may be optionally included in the rubber composition.

It is preferable to use a polybutadiene as the base rubber serving as component (a). Commercial products may be used as the polybutadiene. Illustrative examples include BR01, BR51 and BR730 (all products of JSR Corporation). The proportion of polybutadiene within the base rubber is preferably at least 60 wt %, and more preferably at least 80 wt %. Rubber ingredients other than the above polybutadienes may be included in the base rubber, provided that doing so does not detract from the advantageous effects of the invention. Examples of rubber ingredients other than the above polybutadienes include other polybutadienes, and other diene rubbers such as styrene-butadiene rubbers, natural rubbers, isoprene rubbers and ethylene-propylene-diene rubbers.

The co-crosslinking agent serving as component (b) is an α,β-unsaturated carboxylic acid and/or a metal salt thereof. Specific examples of unsaturated carboxylic acids include acrylic acid, methacrylic acid, maleic acid and fumaric acid. The use of acrylic acid or methacrylic acid is especially preferred. Metal salts of unsaturated carboxylic acids are exemplified by, without particular limitation, the above unsaturated carboxylic acids that have been neutralized with desired metal ions. Specific examples include the zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, which is typically at least 5 parts by weight, preferably at least 9 parts by weight, and more preferably at least 13 parts by weight. The upper limit is typically not more than 60 parts by weight, preferably not more than 50 parts by weight, and more preferably not more than 42 parts by weight. Too much may make the core too hard, giving the ball an unpleasant feel at impact, whereas too little may lower the rebound.

It is preferable to use an organic peroxide as the crosslinking initiator serving as component (c). Commercial products may be used as the organic peroxide. Examples of such products that may be suitably used include Percumyl D, Perhexa C-40 and Perhexa 3M (all from NOF Corporation), and Luperco 231XL (from AtoChem Co.). One of these may be used alone, or two or more may be used together. The amount of organic peroxide included per 100 parts by weight of the base rubber is preferably at least 0.1 part by weight, more preferably at least 0.3 part by weight, and even more preferably at least 0.5 part by weight. The upper limit is preferably not more than 5 parts by weight, more preferably not more than 4 parts by weight, even more preferably not more than 3 parts by weight, and most preferably not more than 2.5 parts by weight. When too much or too little is included, it may not be possible to obtain a ball having a good feel, durability and rebound.

Next, component (d) is a lower alcohol having a molecular weight below 200. Here, "alcohol" refers to a substance having one or more alcoholic hydroxyl group; substances obtained by the polycondensation of polyhydric alcohols having two or more hydroxyl groups are also included among such alcohols. "Lower alcohol" refers to an alcohol having a small number of carbon atoms; that is, an alcohol having a low molecular weight. By including this lower alcohol in the rubber composition, when the rubber composition is vulcanized (cured), a cured rubber product (core) having the desired core hardness profile can be obtained and a reduction in the spin rate of the ball on shots struck is fully achieved, enabling the ball to be endowed with an excellent flight performance.

A monohydric, dihydric or trihydric alcohol (an alcohol having one, two or three alcoholic hydroxyl groups) is especially preferred as the lower alcohol. Specific examples include, but are not limited to, methanol, ethanol, propanol, butanol, ethylene glycol, diethylene glycol, propylene glycol, dipropylene glycol, tripropylene glycol and glycerol. These have a molecular weight below 200, preferably below 150, and more preferably below 100. When the molecular weight is large, i.e., when the number of carbons is too high, the desired core hardness profile cannot be obtained and a reduced spin rate by the ball on shots cannot be fully achieved.

The amount of component (d) included per 100 parts by weight of the base rubber serving as component (a) is preferably at least 0.1 part by weight, and more preferably at least 0.5 part by weight. The upper limit value is preferably 10 parts by weight or less, more preferably 6 parts by weight or less, and even more preferably 3 parts by weight or less. When the content of component (d) is too high, the hardness may decrease and the desired feel, durability and rebound may not be obtained. When the content is too low, the desired core hardness profile may not be obtained and so a reduced spin rate by the ball on shots may not be fully achievable.

Aside from above components (a) to (d), various other additives, such as fillers, antioxidants and organosulfur compounds, may be included, provided that doing so does not detract from the advantageous effects of the invention.

Fillers that may be suitably used include zinc oxide, barium sulfate and calcium carbonate. These may be used singly or two or more may be used in combination. The amount of filler included per 100 parts by weight of the base rubber may be set to preferably at least 1 part by weight, and more preferably at least 3 parts by weight. The upper limit in the amount of filler included per 100 parts by weight of the base rubber may be set to preferably 200 parts by weight or less, more preferably 150 parts by weight or less, and even more preferably 100 parts by weight or less. At a filler content which is too high or too low, a proper weight and a suitable rebound may be impossible to obtain.

Commercial products such as Nocrac NS-6, Nocrac NS-30, Nocrac 200 and Nocrac MB (all products of Ouchi Shinko Chemical Industry Co., Ltd.) may be used as antioxidants. These may be used singly, or two or more may be used in combination.

The amount of antioxidant included per 100 parts by weight of the base rubber, although not particularly limited, is preferably at least 0.05 part by weight, and more preferably at least 0.1 part by weight. The upper limit is preferably 1.0 part by weight or less, more preferably 0.7 part by weight or less, and even more preferably 0.5 part by weight or less. When the antioxidant content is too high or too low, a suitable core hardness gradient may not be obtained, as a result of which it may not be possible to obtain a good rebound, a good durability and a good spin rate-lowering effect on full shots.

In addition, an organosulfur compound may be included in the rubber composition so as to impart an excellent rebound. Thiophenols, thionaphthols, halogenated thiophenols, and metal salts thereof are recommended for this purpose. Illustrative examples include pentachlorothiophenol, pentafluorothiophenol, pentabromothiophenol, p-chlorothiophenol, and the zinc salt of pentachlorothiophenol; and also diphenylpolysulfides, dibenzylpolysulfides, dibenzoylpolysulfides, dibenzothiazoylpolysulfides and dithiobenzoylpolysulfides having 2 to 4 sulfurs. The use of diphenyldisulfide or the zinc salt of pentachlorothiophenol is especially preferred.

The amount of the organosulfur compound included per 100 parts by weight of the base rubber is at least 0.05 part by weight, preferably at least 0.07 part by weight, and more preferably at least 0.1 part by weight. The upper limit is 5 parts by weight or less, preferably 4 parts by weight or less, more preferably 3 parts by weight or less, and most preferably 2 parts by weight or less. Including too much organosulfur compound may excessively lower the hardness, whereas including too little is unlikely to improve the rebound.

The core can be produced by vulcanizing/curing the rubber composition containing the above ingredients. For example, production may be carried out by kneading the composition using a mixer such as a Banbury mixer or a roll mill, compression molding or injection molding the kneaded composition using a core mold, and curing the molded material by suitably heating it at a temperature sufficient for the organic peroxide or co-crosslinking agent to act, i.e., between 100° C. and 200° C., preferably between 140° C. and 180° C., for 10 to 40 minutes.

Next, the hardness profile of the core is described. The core hardnesses described below refer to Shore C hardnesses. These Shore C hardnesses are hardness values measured with a Shore C durometer in accordance with ASTM D2240.

The core has a center hardness (Cc) which is preferably at least 47, more preferably at least 49, and even more preferably at least 51. The upper limit is preferably not more than 62, more preferably not more than 60, and even more preferably not more than 58. When this value is too large, the feel at impact may be hard, or the spin rate on full shots may rise, as a result of which the intended distance may not be achieved. On the other hand, when this value is too small, the rebound may become lower and so a good distance may not be obtained, or the durability to cracking under repeated impact may worsen.

The core has a surface hardness (Cs) which is preferably at least 70, more preferably at least 73, and even more preferably at least 75. The upper limit is preferably not more than 90, more preferably not more than 87, and even more preferably not more than 85. When this value is too low, the core rebound becomes low, which may result in a poor flight by the ball; on full shots, the spin rate of the ball may rise, which may result in a poor flight. On the other hand, when this value is too high, the durability to cracking on repeated impact may worsen.

The difference between the core surface hardness (Cs) and the core center hardness (Cc) is at least 22, preferably at least 23, and more preferably at least 24. The upper limit in the hardness difference is preferably not more than 40, more preferably not more than 35, and even more preferably not more than 30. When this value is too small, the ball spin rate-lowering effect on full shots may be inadequate, resulting in a poor distance. When this value is too large, the initial velocity of the ball on shots may decrease, resulting in a poor distance, or the durability to cracking on repeated impact may worsen.

Regarding the hardnesses at positions at the interior of the core, letting C2 be the Shore C hardness at a position 2 mm from the core center, C4 be the Shore C hardness at a position 4 mm from the core center, C6 be the Shore C hardness at a position 6 mm from the core center, C8 be the Shore C hardness at a position 8 mm from the core center, C10 be the Shore C hardness at a position 10 mm from the core center, C12 be the Shore C hardness at a position 12 mm from the core center, C14 be the Shore C hardness at a position 14 mm from the core center and C16 be the Shore C hardness at a position 16 mm from the core center, the values of C8−C6, C6−C4, C4−C2 and C2−Cc are all 4.0 or less. By setting these hardness differences to 4.0 or less, a hardness profile without abrupt hardness changes can be achieved. Also, of these four hardness differences (the respective values of C8−C6, C6−C4, C4−C2 and C2−Cc), the largest value may be set within a range that is preferably between 2.0 and 4.0, more preferably between 2.5 and 3.7, and even more preferably between 2.8 and 3.5. When the largest of these values exceeds the above range, the spin rate on full shots may rise or the initial velocity on shots may decrease, resulting in a poor distance, or the durability of the ball to cracking on repeated impact may worsen. On the other hand, when the largest of these values is smaller than the above range, the spin rate on full shots may rise, which may result in a poor distance.

The values of C16−C14, C14−C12, C12−C10 and C10−C8 are all 5.5 or less. By setting these hardness differences to 5.5 or less, a hardness profile without abrupt hardness changes can be achieved. Also, of these four hardness differences (the respective values of C16−C14, C4−C12, C12−C10 and C10−C8), the largest value may be set within a range that is preferably between 2.5 and 5.5, more preferably between 3.2 and 5.3, and even more preferably between 3.5 and 5.2. When the largest of these values exceeds the above range, the spin rate on full shots may rise or the initial velocity on shots may decrease, resulting in a poor distance, or the durability of the ball to cracking on repeated impact may worsen. On the other hand, when the largest of these values is smaller than the above range, the spin rate on full shots may rise, which may result in a poor distance.

Also, the internal hardness of the core is such that, in the measured hardnesses obtained by measuring the hardness at 2 mm intervals outward from the core center but not measuring the hardness at a position 2 mm inside the surface, letting the differences between adjoining measured hardnesses from the core center outward be respectively $A_0$, $A_1$, $A_2$, $A_3$ . . . (that is, letting $A_0$=C2−Cc, $A_1$=C4−C2, $A_2$=C6−C4, $A_3$=C8−C6, . . . ), these adjoining measured hardness differences have respective differences therebetween, defined as, respectively, $A_1−A_0$, $A_2−A_1$, $A_3−A_2$ . . . , which are all values of preferably 3.5 or less, more preferably 3.3 or less, and even more preferably 3.1 or less. The significance of setting the hardness differences in this way is that there are no places within the core hardness profile where the hardness changes abruptly. Outside of these numerical ranges, the spin rate of the ball on full shots rises and a good distance may not be obtained.

In this invention, letting Cs-3 be the Shore C hardness at a position 3 mm inside the core surface and Cm be the hardness at a position midway between the core surface and the core center, the internal hardness of the core satisfies formulas (2) and (3) below.

$$(Cs-Cm)/(C4-Cc) \geq 4.0 \quad (2)$$

$$Cs-Cs\text{-}3 \leq 5.0 \quad (3)$$

With regard to formula (2), from the standpoint of setting the hardness gradient so as to be higher in the outer half of the core than near the center of the core, the value of (Cs−Cm) C4−Cc) is at least 4.0, preferably at least 4.2, and more preferably at least 4.4. The upper limit is preferably 10.0 or less, more preferably 8.5 or less, and even more preferably 7.2 or less. When this value is too large, the initial velocity on shots may decrease and a good distance may not be obtained, or the durability of the ball to cracking on repeated impact may worsen. On the other hand, when this value is too small, the spin rate-lowering effect on full shots may be inadequate and so a good distance may not be obtained.

With regard to formula (3), from the standpoint of designing the hardness such that the hardness gradient near the core surface does not rise above a given level, the value of Cs−Cs-3 is 5.0 or less, preferably 4.5 or less, and more preferably 4.0 or less. The lower limit is preferably at least 1.0, more preferably at least 2.0, and even more preferably at least 3.0. When this value is too large, the durability to cracking on repeated impact may worsen. On the other hand, when this value is too small, the spin rate-lowering effect on full shots may be inadequate and a good distance may not be achieved.

Next, the intermediate layer is described.

The intermediate layer has a material hardness which, although not particularly limited, on the Shore D hardness scale is preferably at least 60, more preferably at least 62, and even more preferably at least 64. The upper limit is preferably not more than 72, more preferably not more than 69, and even more preferably not more than 67. On the Shore C hardness scale, the material hardness is preferably at least 89, more preferably at least 92, and even more preferably at least 94. The upper limit is preferably not more than 100, more preferably not more than 98, and even more preferably not more than 96.

The sphere obtained by encasing the core with the intermediate layer (intermediate layer-encased sphere) has a surface hardness which, on the Shore D hardness scale, is preferably at least 66, more preferably at least 68, and even more preferably at least 70. The upper limit is preferably not more than 78, more preferably not more than 75, and even more preferably not more than 73. On the Shore C hardness scale, the surface hardness is preferably at least 93, more preferably at least 95, and even more preferably at least 97. The upper limit is preferably not more than 100, and more preferably not more than 99.

When the material hardness and surface hardness of the intermediate layer are lower than the above respective ranges, the spin rate on full shots may rise or the initial velocity may decrease, resulting in a poor distance. On the other hand, when the material hardness and surface hardness are too high, the durability of the ball to cracking on repeated impact may worsen or the spin rate in the short game may become too low.

The intermediate layer has a thickness of preferably at least 0.8 mm, more preferably at least 1.0 mm, and even more preferably at least 1.1 mm. The upper limit in the intermediate layer thickness is preferably 2.3 mm or less, more preferably 2.1 mm or less, and even more preferably 1.9 mm or less. When the intermediate layer is too thin, the durability to cracking on repeated impact may worsen or the spin rate on full shots may rise, as a result of which a good distance may not be achieved. When the intermediate layer is too thick, the feel at impact may become too hard or the initial velocity on full shots may be low and so a good distance may not be achieved.

Various types of thermoplastic resins, especially ionomeric resins, that are used as golf ball materials may be suitably used as the intermediate layer material. A commercial product may be used as the ionomeric resin. Alternatively, the resin material used in the intermediate layer may be one obtained by blending, of commercially available ionomeric resins, a high-acid ionomeric resin having an acid content of at least 16 wt % with an ordinary ionomeric resin. With such a blend, an increased distance due to a reduced spin rate on full shots and a good durability to repeated impact can both be obtained.

The amount of unsaturated carboxylic acid included in the high-acid ionomeric resin (acid content) is typically at least 16 wt %, preferably at least 17 wt %, and more preferably at least 18 wt %. The upper limit is preferably 22 wt % or less, more preferably 21 wt % or less, and even more preferably 20 wt % or less. When this value is too small, the spin rate on full shots may rise, as a result of which the intended distance may not be achieved. On the other hand, when this value is too large, the feel at impact may be too hard or the durability to cracking on repeated impact may worsen.

The amount of high-acid ionomeric resin per 100 wt % of the resin material is preferably at least 30 wt %, more preferably at least 50 wt %, and even more preferably at least 60 wt %. When the amount of such high-acid ionomeric resin included is too low, the spin rate on shots with a driver (W #1) may be high, as a result of which a good distance may not be achieved.

Depending on the intended use, optional additives may be suitably included in the intermediate layer material. For example, pigments, dispersants, antioxidants, ultraviolet absorbers and light stabilizers may be added. When these additives are included, the amount added per 100 parts by weight of the overall base resin is preferably at least 0.1 part by weight, and more preferably at least 0.5 part by weight. The upper limit is preferably not more than 10 parts by weight, and more preferably not more than 4 parts by weight.

It is desirable to abrade the surface of the intermediate layer in order to increase adhesion of the intermediate layer material with the polyurethane that is preferably used in the subsequently described cover material. In addition, it is desirable to apply a primer (adhesive) to the surface of the intermediate layer following such abrasion treatment or to add an adhesion reinforcing agent to the intermediate layer material.

The intermediate layer material has a specific gravity which is typically less than 1.1, preferably between 0.90 and 1.05, and more preferably between 0.93 and 0.99. Outside of this range, the rebound of the overall ball may decrease and a good distance may not be obtained, or the durability of the ball to cracking on repeated impact may worsen.

Next, the cover (outermost layer) is described.

The cover has a material hardness which, although not particularly limited, on the Shore D hardness scale is preferably at least 25, more preferably at least 32, and even more preferably at least 36. The upper limit is preferably not more than 55, more preferably not more than 48, and even more preferably not more than 43. On the Shore C hardness scale, the material hardness is preferably at least 43, more preferably at least 53, and even more preferably at least 58. The upper limit is preferably not more than 83, more preferably not more than 74, and even more preferably not more than 67.

The surface hardness of the sphere obtained by encasing the intermediate layer-encased sphere with the cover (i.e., the ball), expressed on the Shore D hardness scale, is preferably at least 50, more preferably at least 52, and even more preferably at least 54. The upper limit is preferably not more than 62, more preferably not more than 60, and even more preferably not more than 58. On the Shore C hardness scale, the surface hardness is preferably at least 73, more preferably at least 77, and even more preferably at least 80. The upper limit is preferably not more than 92, more preferably not more than 88, and even more preferably not more than 85.

When the material hardness of the cover and the surface hardness of the ball are too much lower than the above respective ranges, the spin rate of the ball on shots with a driver (W #1) may rise and a good distance may not be achieved. On the other hand, when the material hardness of the cover and the surface hardness of the ball are too high, the ball may not be receptive to spin in the short game or the scuff resistance may worsen.

The cover has a thickness of preferably at least 0.3 mm, more preferably at least 0.5 mm, and even more preferably at least 0.6 mm. The upper limit in the cover thickness is preferably not more than 1.2 mm, more preferably not more than 0.9 mm, and even more preferably not more than 0.8 mm. When the cover is too thick, the spin rate may rise or the initial velocity may decrease, possibly resulting in a poor distance. When the cover is too thin, the ball may not be receptive to spin in the short game or the scuff resistance may worsen. As used herein, "cover thickness" refers to the value of (ball diameter–diameter of intermediate layer-encased sphere)/2.

Various types of thermoplastic resins and thermoset resins employed as cover stock in golf balls may be used as the cover material. In particular, a urethane resin (polyurethane) such as a thermoplastic polyurethane can be preferably used. That is, in this invention, in order to be able to obtain an excellent spin performance that is capable of satisfying professional golfers and skilled amateurs, a soft material is required as the cover material. In order to additionally achieve both an excellent scuff resistance and an excellent rebound, it is preferable to use a cover composed primarily of polyurethane.

The polyurethane has a structure which includes soft segments composed of a polymeric polyol (polymeric glycol) that is a long-chain polyol, and hard segments composed of a chain extender and a polyisocyanate compound.

Here, the polymeric polyol serving as a starting material may be any that has hitherto been used in the art relating to polyurethane materials, and is not particularly limited. Illustrative examples include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Specific examples of polyester polyols that may be used include adipate-type polyols such as polyethylene adipate glycol, polypropylene adipate glycol, polybutadiene adipate glycol and polyhexamethylene adipate glycol, and lactone-type polyols such as polycaprolactone polyol. Specific examples of polyether polyols include poly(ethylene glycol), poly(propylene glycol), poly(tetramethylene glycol) and poly(methyl tetramethylene glycol). These polyols may be used singly, or two or more may be used in combination.

It is preferable to use a polyether polyol as the polymeric polyol.

The long-chain polyol has a number-average molecular weight that is preferably within the range of 1,000 to 5,000. By using a long-chain polyol having a number-average molecular weight in this range, golf balls made with a polyurethane composition that have excellent properties, including a good rebound and a good productivity, can be reliably obtained. The number-average molecular weight of the long-chain polyol is more preferably in the range of 1,500 to 4,000, and even more preferably in the range of 1,700 to 3,500.

Here and below, the number-average molecular weight refers to the number-average molecular weight based on the hydroxyl value measured in accordance with JIS K1557.

The chain extender is not particularly limited; any chain extender that has hitherto been employed in the art relating to polyurethanes may be suitably used. In this invention, low-molecular-weight compounds with a molecular weight of 2,000 or less which have on the molecule two or more active hydrogen atoms capable of reacting with isocyanate groups may be suitably used. Of these, preferred use can be made of aliphatic diols having from 2 to 12 carbon atoms. Specific examples include 1,4-butylene glycol, 1,2-ethylene glycol, 1,3-butanediol, 1,6-hexanediol and 2,2-dimethyl-1,3-propanediol, with the use of 1,4-butylene glycol being especially preferred.

The polyisocyanate is exemplified by alicyclic diisocyanates, aromatic diisocyanates and aliphatic diisocyanates. Specifically, use can be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, 4,4'-dicyclohexylmethane diisocyanate, 1,3-bis(isocyanatomethyl)cyclohexane, trans-1,4-cyclohexane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. However, depending on the type of isocyanate, the crosslinking reactions during injection molding may be difficult to control.

The use of, in particular, an alicyclic diisocyanate such as 4,4'-dicyclohexylmethane diisocyanate, 1,3-bis(isocyanatomethyl)cyclohexane, isophorone diisocyanate or trans-1,4-cyclohexane diisocyanate as the above polyisocyanate is preferred.

The ratio of active hydrogen atoms to isocyanate groups in the polyurethane-forming reaction may be suitably adjusted within a preferred range. Specifically, in preparing a polyurethane by reacting the above long-chain polyol, polyisocyanate and chain extender, it is preferable to use the respective components in proportions such that the amount of isocyanate groups included in the polyisocyanate per mole of active hydrogen atoms on the long-chain polyol and the chain extender is from 0.95 to 1.05 moles.

The method for preparing the polyurethane is not particularly limited. Preparation using the long-chain polyol, chain extender and polyisocyanate may be carried out by either a prepolymer process or a one-shot process via a known urethane-forming reaction. Of these, melt polymerization in the substantial absence of solvent is preferred. Production by continuous melt polymerization using a multiple screw extruder is especially preferred.

It is preferable to use a thermoplastic polyurethane material as the polyurethane, with an ether-based thermoplastic polyurethane material being especially preferred. The thermoplastic polyurethane material used may be a commercial product, illustrative examples of which include those available as Elastollan® from BASF Japan. Ltd., those available as Pandex® from DIC Covestro Polymer, Ltd., and those available under the trade name RESAMINE from Dainichiseika Color & Chemicals Mfg. Co., Ltd.

Various additives other than the above urethane resins may be optionally included in the cover material. For example, pigments, dispersants, antioxidants, light stabilizers, ultraviolet absorbers and internal mold lubricants may be suitably included.

The manufacture of multi-piece solid golf balls in which the above-described core, intermediate layer and cover (outermost layer) are formed as successive layers may be carried out by a conventional method such as a known injection molding process. For example, a multi-piece solid golf ball can be produced by injection-molding the intermediate layer material over the core in an injection mold so as to obtain an intermediate layer-encased sphere, and subsequently injection-molding the material for the cover serving as the outermost layer over the intermediate layer-encased sphere. Alternatively, the encasing layers may each be formed by enclosing the sphere to be encased within two half-cups that have been pre-molded into hemispherical shapes and then molding under applied heat and pressure.

Hardness Relationships Among Layers

In the golf ball of the invention, it is critical for the Shore C surface hardness of the sphere obtained by encasing the core with the intermediate layer (intermediate layer-encased sphere) and the Shore C surface hardness of the ball to satisfy the following relationship:

$$\text{surface hardness of ball} < \text{surface hardness of intermediate layer-encased sphere} \quad (4).$$

By satisfying this hardness relationship, a good controllability in the short game and a superior distance on full shots with not only a driver (W #1) but also with a long iron or a middle iron can both be achieved.

The value obtained by subtracting the Shore C surface hardness of the intermediate layer-encased sphere from the Shore C surface hardness of the ball is preferably −30 or more, more preferably −25 or more, and even more preferably −20 or more. The upper limit is preferably −5 or less, more preferably −8 or less, and even more preferably −13 or less. When this value is too small (too far from zero on the negative side), the spin rate on full shots may become too high and a good distance may not be obtained, or adherence between the cover and the intermediate layer may be poor and the durability to cracking on repeated impact may worsen. On the other hand, when this value is too large (too close to zero on the negative side), the spin rate of the ball on full shots may rise, resulting in a poor distance, or the scuff resistance may worsen.

The value obtained by subtracting the Shore C surface hardness of the core from the Shore C surface hardness of the intermediate layer-encased sphere is preferably 5 or more, more preferably 12 or more, and even more preferably 15 or more. The upper limit is preferably 30 or less, more preferably 25 or less, and even more preferably 22 or less. When this value is too small, the spin rate on full shots may become too high and a good distance may not be obtained. When this value is too large, the durability of the ball to cracking on repeated impact may worsen.

Thickness Relationships Among Layers

The sum of the thicknesses of the cover and the intermediate layer, i.e., the value expressed as (cover thickness+intermediate layer thickness), is preferably at least 1.3 mm, more preferably at least 1.7 mm, and even more preferably at least 2.0 mm. The upper limit is preferably 3.6 mm or less, more preferably 3.2 mm or less, and even more preferably 2.8 mm or less. When this combined thickness is too large, the spin rate on full shots may become too high and a good distance may not be achieved. On the other hand, when the combined thickness is too small, the durability of the ball to cracking on repeated impact may worsen.

It is preferable for the intermediate layer to be thicker than the cover. The value obtained by subtracting the cover thickness from the intermediate layer thickness, i.e., the value expressed as (intermediate layer thickness−cover thickness), is preferably at least 0.3 mm, more preferably at least 0.6 mm, and even more preferably at least 0.9 mm. The upper limit is preferably 1.6 mm or less, more preferably 1.3 mm or less, and even more preferably 1.1 mm or less. When this value falls outside of the above range, the spin rate on full shots may become too high and a good distance may not be obtained.

Numerous dimples may be formed on the outside surface of the cover serving as the outermost layer. The number of dimples arranged on the cover surface, although not particularly limited, is preferably at least 250, more preferably at least 300, and even more preferably at least 320. The upper limit is preferably not more than 380, more preferably not more than 350, and even more preferably not more than 340. When the number of dimples is higher than this range, the ball trajectory may become lower and the distance traveled by the ball may decrease. On the other hand, when the number of dimples is lower that this range, the ball trajectory may become higher and a good distance may not be achieved.

The dimple shapes used may be of one type or may be a combination of two or more types suitably selected from among, for example, circular shapes, various polygonal shapes, dewdrop shapes and oval shapes. When circular dimples are used, the dimple diameter may be set to at least about 2.5 mm and up to about 6.5 mm, and the dimple depth may be set to at least 0.08 mm and up to 0.30 mm.

In order for the aerodynamic properties to be fully manifested, it is desirable for the dimple coverage ratio on the spherical surface of the golf ball, i.e., the dimple surface coverage SR, which is the sum of the individual dimple surface areas, each defined by the flat plane circumscribed by the edge of a dimple, as a percentage of the spherical surface area of the ball were the ball to have no dimples thereon, to be set to at least 70% and not more than 90%. Also, to optimize the ball trajectory, it is desirable for the value V, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of the dimple, with respect to the volume of the ball sphere were the ball to have no dimples thereon, to be set to at least 0.6% and not more than 1.0%. Outside of the above ranges in these respective values, the resulting trajectory may not enable a good distance to be achieved and so the ball may fail to travel a fully satisfactory distance.

A coating layer may be formed on the surface of the cover. This coating layer can be formed by applying various types of coating materials. Because the coating must be capable of enduring the harsh conditions of golf ball use, it is desirable to use a coating composition in which the chief component is a urethane coating material composed of a polyol and a polyisocyanate.

The polyol component is exemplified by acrylic polyols and polyester polyols. These polyols include modified polyols. To further increase workability, other polyols may also be added.

It is suitable to use two types of polyester polyols together as the polyol component. In this case, letting the two types of polyester polyol be component (a) and component (b), a polyester polyol in which a cyclic structure has been introduced onto the resin skeleton may be used as the polyester polyol serving as component (a). Examples include polyester polyols obtained by the polycondensation of a polyol having an alicyclic structure, such as cyclohexane dimethanol, with a polybasic acid; and polyester polyols obtained by the polycondensation of a polyol having an alicyclic structure with a diol or triol and a polybasic acid. A polyester polyol having a branched structure may be used as the polyester polyol serving as component (b). Examples include polyester polyols having a branched structure, such as NIPPOLAN 800, from Tosoh Corporation.

The polyisocyanate is exemplified without particular limitation by commonly used aromatic, aliphatic, alicyclic and other polyisocyanates. Specific examples include tolylene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate and 1-isocyanato-3,3,5-trimethyl-4-isocyanatomethylcyclohexane. These may be used singly or in admixture.

Depending on the coating conditions, various types of organic solvents may be mixed into the coating composition. Examples of such organic solvents include aromatic solvents such as toluene, xylene and ethylbenzene; ester solvents such as ethyl acetate, butyl acetate, propylene glycol methyl ether acetate and propylene glycol methyl ether propionate; ketone solvents such as acetone, methyl ethyl ketone, methyl isobutyl ketone and cyclohexanone; ether solvents such as diethylene glycol dimethyl ether, diethylene glycol diethyl ether and dipropylene glycol dimethyl ether; alicyclic hydrocarbon solvents such as cyclohexane, methyl cyclohexane and ethyl cyclohexane; and petroleum hydrocarbon solvents such as mineral spirits.

The thickness of the coating layer made of the coating composition, although not particularly limited, is typically from 5 to 40 µm, and preferably from 10 to 20 µm. As used herein, "coating layer thickness" refers to the coating thickness obtained by averaging the measurements taken at a total of three places: the center of a dimple and two places located at positions between the dimple center and the dimple edge.

In this invention, the coating layer composed of the above coating composition has an elastic work recovery that is preferably at least 60%, and more preferably at least 80%. At a coating layer elastic work recovery in this range, the coating layer has a high elasticity and so the self-repairing ability is high, resulting in an outstanding abrasion resistance. Moreover, the performance attributes of golf balls coated with this coating composition can be improved. The method of measuring the elastic work recovery is described below.

The elastic work recovery is one parameter of the nanoindentation method for evaluating the physical properties of coating layers, this being a nanohardness test method that controls the indentation load on a micro-newton (µN) order and tracks the indenter depth during indentation to a nanometer (nm) precision. In prior methods, only the size of the deformation (plastic deformation) mark corresponding to the maximum load could be measured. However, in the nanoindentation method, the relationship between the indentation load and the indentation depth can be obtained by continuous automated measurement. Hence, unlike in the past, there are no individual differences between observers when visually measuring a deformation mark under an optical microscope, and so it is thought that the physical properties of the coating layer can be precisely measured. Given that the coating layer on the ball surface is strongly affected by the impact of drivers and other clubs and has a not inconsiderable influence on various golf ball properties, measuring the coating layer by the nanohardness test method and carrying out such measurement to a higher precision than in the past is a very effective method of evaluation.

The hardness of the coating layer, expressed on the Shore M hardness scale, is preferably at least 40, and more preferably at least 60. The upper limit is preferably not more than 95, and more preferably not more than 85. This Shore M hardness is measured in accordance with ASTM D2240. The hardness of the coating layer, expressed on the Shore C hardness scale, is preferably at least 30 and has an upper limit of preferably not more than 90. This Shore C hardness is measured in accordance with ASTM D2240. At coating layer hardnesses that are higher than these ranges, the coating may become brittle when the ball is repeatedly struck, which may make it incapable of protecting the cover layer. On the other hand, coating layer hardnesses that are lower than the above range are undesirable because the ball surface more readily incurs damage upon striking a hard object.

The difference between the coating layer hardness (Hc) and the core center hardness (Cc) on the Shore C hardness scale, expressed as Hc–Cc, is preferably from −40 to 40, more preferably from −20 to 20, and even more preferably from −10 to 10. When the difference falls outside of this range, the spin rate of the ball on full shots may rise, as a result of which a good distance may not be achieved.

The difference between the coating layer hardness (Hc) and the material hardness of the cover (Hm) on the Shore C hardness scale, expressed as Hc–Hm, is preferably from −40 to 40, more preferably from −20 to 20, and even more preferably from −10 to 10. When the difference falls outside of this range, the spin rate of the ball on full shots may rise, as a result of which a good distance may not be achieved.

When the above coating composition is used, the formation of a coating layer on the surface of golf balls manufactured by a commonly known method can be carried out via the steps of preparing the coating composition at the time of application, applying the composition to the golf ball surface by a conventional coating operation, and drying the applied composition. The coating method used at this time is not particularly limited. For example, spray painting, electrostatic painting or dipping may be suitably used.

The overall golf ball has a deflection (mm) when compressed under a final load of 1,275 N (130 kgf) from an initial load of 98 N (10 kgf) which, although not particularly limited, is preferably at least 1.8 mm, more preferably at least 2.0 mm, and even more preferably at least 2.2 mm. The upper limit is preferably 3.7 mm or less, more preferably 3.3 mm or less, and even more preferably 3.0 mm or less. When the golf ball deflection is too small, i.e., when the ball is too hard, the feel at impact may become too hard or the spin rate on full shots may rise excessively and, particularly on shots with an iron, a good distance may not be obtained. On the other hand, when the deflection of the golf ball is too large, i.e., when the ball is too soft, the initial velocity on full shots may be low and, particularly on shots with a driver (W #1), a good distance may not be obtained, or the durability of the ball to cracking on repeated impact may worsen.

The multi-piece solid golf ball of the invention can be made to conform to the Rules of Golf for play. The inventive ball may be formed to a diameter which is such that the ball does not pass through a ring having an inner diameter of 42.672 mm and is not more than 42.80 mm, and to a weight which is preferably between 45.0 and 45.93 g.

EXAMPLES

The following Examples and Comparative Examples are provided to illustrate the invention, and are not intended to limit the scope thereof.

Examples 1 to 5. Comparative Examples 1 to 7

Formation of Core

Solid cores except Example 3 are produced by preparing rubber compositions for the respective Examples and Comparative Examples shown in Table 1, and then molding/vulcanizing the compositions under the vulcanization conditions shown for each Example in the table. In Example 3, a solid core was produced by preparing a rubber composition shown in Table 1, and then molding/vulcanizing the composition under the vulcanization condition shown in the table.

TABLE 1

| Core formulation (pbw) | Example | | | | | Comparative Example | | | | | | |
|---|---|---|---|---|---|---|---|---|---|---|---|---|
|  | 1 | 2 | 3 | 4 | 5 | 1 | 2 | 3 | 4 | 5 | 6 | 7 |
| Polybutadiene (1) | 100 | 100 | 100 | 100 | 100 | 100 | 100 | 100 | 100 | 100 |  | 100 |
| Polybutadiene (2) |  |  |  |  |  |  |  |  |  |  | 100 |  |
| Zinc acrylate (1) | 41.1 | 38.1 | 34.8 | 33.2 | 41.1 | 37.0 | 34.0 | 35.5 | 32.0 | 32.0 |  | 41.1 |
| Zinc acrylate (2) |  |  |  |  |  |  |  |  |  |  | 33.0 |  |
| Organic peroxide (1) | 0.5 | 0.5 | 0.5 | 0.5 | 0.5 | 1.0 | 1.0 |  | 0.6 | 0.5 | 0.8 | 0.5 |
| Organic peroxide (2) |  |  |  |  |  |  |  | 2.5 | 1.2 |  |  |  |
| Organic peroxide (3) |  |  |  |  |  |  |  |  |  | 2.0 |  |  |
| Propylene glycol | 1.5 | 1.0 | 1.5 | 1.5 | 1.5 |  |  |  |  |  |  | 1.5 |
| Water |  |  |  |  |  | 0.6 | 0.7 |  |  |  |  |  |
| Zinc stearate |  |  |  |  |  |  |  |  |  | 5.0 |  |  |
| Stearic acid |  |  |  |  |  |  |  |  |  |  | 10.0 |  |
| Antioxidant (1) |  |  |  |  |  | 0.1 | 0.1 | 0.1 | 0.1 | 0.1 |  |  |
| Antioxidant (2) | 0.5 | 0.5 | 0.5 | 0.5 | 0.5 |  |  |  |  |  |  | 0.5 |
| Zinc oxide | 17.4 | 18.6 | 20.0 | 20.6 | 17.4 | 18.9 | 20.2 | 20.1 | 22.0 | 22.6 | 22.8 | 18.4 |
| Zinc salt of pentachlorothiophenol | 1.0 | 1.0 | 1.0 | 1.0 | 1.0 | 0.6 | 0.6 | 0.4 | 0.4 | 0.6 | 0.4 | 1.0 |
| Vulcanization temperature (° C.) | 155 | 155 | 155 | 155 | 155 | 155 | 155 | 155 | 155 | 155 | 170 | 155 |
| Vulcanization time (min) | 19 | 19 | 19 | 19 | 19 | 15 | 15 | 14 | 14 | 14 | 25 | 19 |

Details on the ingredients mentioned in Table 1 are given below.
Polybutadiene (1): Available under the trade name "BR 01" from JSR Corporation
Polybutadiene (2): Available under the trade name "BR 730" from JSR Corporation
Zinc acrylate (1): "ZN-DA85S" from Nippon Shokubai Co., Ltd.
Zinc acrylate (2): "Sanceler SR" from Sanshin Chemical Industry Co., Ltd.
Organic peroxide (1): Dicumyl peroxide, available under the trade name "Percumyl D" from NOF Corporation
Organic peroxide (2): Mixture of 1,1-di(t-butylperoxy)cyclohexane and silica, available under the trade name "Perhexa C-40" from NOF Corporation
Organic peroxide (3): Dilauroyl peroxide, available under the trade name "Peroyl L" from NOF Corporation
Propylene glycol: A lower divalent alcohol (molecular weight, 76.1), from Hayashi Pure Chemical Ind., Ltd.
Water: Pure water (from Seiki Chemical Industrial Co., Ltd.)
Zinc stearate: Available as "Zinc Stearate G" from NOF Corporation
Stearic acid: Available from Tokyo Chemical Industry Co., Ltd.
Antioxidant (1): 2,2'-Methylenebis(4-methyl-6-butylphenol), available under the trade name "Nocrac NS-6" from Ouchi Shinko Chemical Industry Co., Ltd.
Antioxidant (2): 2-Mercaptobenzimidazole, available under the trade name "Nocrac MB" from Ouchi Shinko Chemical Industry Co., Ltd.
Zinc oxide: Available under the trade name "Zinc Oxide Grade 3" from Sakai Chemical Co., Ltd.
Zinc salt of pentachlorothiophenol: Available from Wako Pure Chemical Industries, Ltd.

Formation of Intermediate Layer and Cover (Outermost Layer)

Next, in each of the Examples and Comparative Examples except Example 3, an intermediate layer is formed by injection-molding the intermediate layer material of formulation I or II shown in Table 2 over the core in that Example. A cover (outermost layer) is then formed by injection-molding the cover material of formulation III. IV or V shown in Table 2 over the resulting intermediate layer-encased sphere. In Example 3, an intermediate layer and a cover were formed by the same way as described above. A plurality of given dimples common to all the Examples and Comparative Examples are formed at this time on the surface of the cover.

TABLE 2

| Resin composition (pbw) | I | II | III | IV | V |
|---|---|---|---|---|---|
| Himilan 1706 | 15 | | | | |
| AM 7318 | 85 | | | | |
| Nucrel AN4319 | | 100 | | | |
| Magnesium stearate | | 70 | | | |
| Magnesium oxide | | 1.9 | | | |
| Trimethylolpropane | 1.1 | 1.1 | | | |
| Polyurethane (1) | | | 90 | 25 | |
| Polyurethane (2) | | | 10 | 75 | |
| Polyurethane (3) | | | | | 100 |
| Light stabilizer | | | 0.2 | 0.2 | 0.2 |
| Titanium oxide | | | 4 | 4 | 4 |
| Blue pigment | | | 0.04 | 0.04 | 0.04 |

Trade names of the materials in the above table are given below.
Himilan 1706: An ionomer available from Dow-Mitsui Polychemicals Co., Ltd.
AM 7318: An ionomer available from Dow-Mitsui Polychemicals Co., Ltd.
Nucrel AN4319: An ethylene copolymer available from Dow-Mitsui Polychemicals Co., Ltd.
Magnesium stearate: Available as "Magnesium Stearate G" from NOF Corporation
Magnesium oxide: Available as "Kyowamag MF-150" from Kyowa Chemical Industry Co., Ltd.
Trimethylolpropane: Available from Tokyo Chemical Industry Co., Ltd.
Polyurethane (1): A thermoplastic polyurethane elastomer available from BASF Japan, Ltd. under the trade name Elastollan ® NY90A
Polyurethane (2): A thermoplastic polyurethane elastomer available from BASF Japan, Ltd. under the trade name Elastollan ® NY97A
Polyurethane (3): A thermoplastic polyurethane elastomer available from BASF Japan, Ltd. under the trade name Elastollan ® ET858D
Light stabilizer: A hindered amine-type light stabilizer (HALS), available under the trade name Tinuvin ® 770 from BASF Japan, Ltd.

Formation of Coating Layer

Next, as a coating composition common to all the Examples and Comparative Examples except Example 3, Coating Composition I shown in Table 3 below is applied with an air spray gun onto the surface of the cover (outermost layer) on which numerous dimples had been formed, thereby producing golf balls having a 15 μm-thick coating layer formed thereon. In Example 3, the same coating composition as described above was applied by the same way as described above, thereby producing golf balls having a 15 μm-thick coating layer formed thereon.

TABLE 3

| Coating composition I (pbw) | Base resin | Polyester polyol (A) | 23 |
|---|---|---|---|
| | | Polyester polyol (B) | 15 |
| | | Organic solvent | 62 |
| | Curing agent | Isocyanate (HMDI isocyanurate) | 42 |
| | | Solvent | 58 |
| | Molar blending ratio (NCO/OH) | | 0.89 |
| Coating properties | Elastic work recovery (%) | | 84 |
| | Shore M hardness | | 84 |
| | Shore C hardness | | 63 |
| | Thickness (μm) | | 15 |

Polyester Polyol (A) Synthesis Example

A reactor equipped with a reflux condenser, a dropping funnel, a gas inlet and a thermometer was charged with 140 parts by weight of trimethylolpropane, 95 parts by weight of ethylene glycol, 157 parts by weight of adipic acid and 58 parts by weight of 1,4-cyclohexanedimethanol, following which the temperature was raised to between 200 and 240° C. under stirring and the reaction was effected by 5 hours of heating. This yielded Polyester Polyol (A) having an acid value of 4, a hydroxyl value of 170 and a weight-average molecular weight (Mw) of 28,000.

Next, the Polyester Polyol (A) thus synthesized was dissolved in butyl acetate, thereby preparing a varnish having a nonvolatiles content of 70 wt %.

The base resin for Coating Composition I in Table 3 was prepared by mixing 23 parts by weight of the above polyester polyol solution together with 15 parts by weight of Polyester Polyol (B) (the saturated aliphatic polyester polyol NIPPOLAN 800 from Tosoh Corporation; weight-average molecular weight (Mw), 1,000; 100% solids) and the organic solvent. This mixture had a nonvolatiles content of 38.0 wt %.

Elastic Work Recovery

The elastic work recovery of the coating material is measured using a coating sheet having a thickness of 50 μm. The ENT-2100 nanohardness tester from Erionix Inc. is used as the measurement apparatus, and the measurement conditions are as follows.

Indenter: Berkovich indenter (material: diamond; angle α: 65.03°)
Load F: 0.2 mN
Loading time: 10 seconds
Holding time: 1 second
Unloading time: 10 seconds The elastic work recovery is calculated as follows, based on the indentation work $W_{elast}$(Nm) due to spring-back deformation of the coating and on the mechanical indentation work $W_{total}$ (Nm).

Elastic work recovery=$W_{elast}/W_{total} \times 100 (\%)$

Shore C Hardness and Shore M Hardness

The Shore C hardnesses and Shore M hardnesses in Table 3 above are determined by fabricating the material to be tested into 2 mm thick sheets and stacking three such sheets together to form a test specimen. Measurements are carried out using a Shore C durometer and a Shore M durometer in accordance with ASTM D2240.

Various properties of the resulting golf balls, including the internal hardnesses of the core at various positions, the diameters of the core and each layer-encased sphere, the thickness and material hardness of each layer and the surface hardness of each layer-encased sphere, are evaluated by the following methods. The results are presented in Tables 4 and 5.

Diameters of Core and Intermediate Layer-Encased Sphere

The diameters at five random places on the surface are measured at a temperature of 23.9±1° C. and, using the average of these measurements as the measured value for a single core or intermediate layer-encased sphere, the average diameter for ten such spheres is determined.

Ball Diameter

The diameters at 15 random dimple-free areas are measured at a temperature of 23.9±1° C. and, using the average of these measurements as the measured value for a single ball, the average diameter for ten balls is determined.

Deflections of Core and Ball

The sphere (either a core or a ball) is placed on a hard plate and the amount of deflection when compressed under a final load of 1,275 N (130 kgf) from an initial load of 98 N (10 kgf) is measured. The amount of deflection here refers in each case to the measured value obtained after holding the core or ball isothermally at 23.9° C.

Core Hardness Profile

The indenter of a durometer is set substantially perpendicular to the spherical surface of the core, and the core surface hardness Cs on the Shore C hardness scale is measured in accordance with ASTM D2240. Cross-sectional hardnesses at given positions in the core are measured, these being the core center hardness Cc, the hardness C2 at a position 2 mm from the core center, the hardness C4 at a position 4 mm from the core center, the hardness C6 at a position 6 mm from the core center, the hardness C8 at a position 8 mm from the core center, the hardness C10 at a position 10 mm from the core center, the hardness C12 at a position 12 mm from the core center, the hardness C14 at a position 14 mm from the core center, the hardness C16 at a position 16 mm from the core center, the hardness Cs-3 at a position 3 mm inside the core surface and the hardness Cm at a position midway between the core surface and the core center. The cross-sectional hardnesses at these respective positions are measured as Shore C hardness values by perpendicularly pressing the indenter of a durometer against the place to be measured in the flat cross-section obtained by cutting the core into hemispheres. The P2 Automatic Rubber Hardness Tester (Kobunshi Keiki Co., Ltd.) equipped with a Shore C durometer is used for measuring the hardness. The maximum value is read off as the hardness value. Measurements are all carried out in a 23±2° C. environment.

Figure 2:
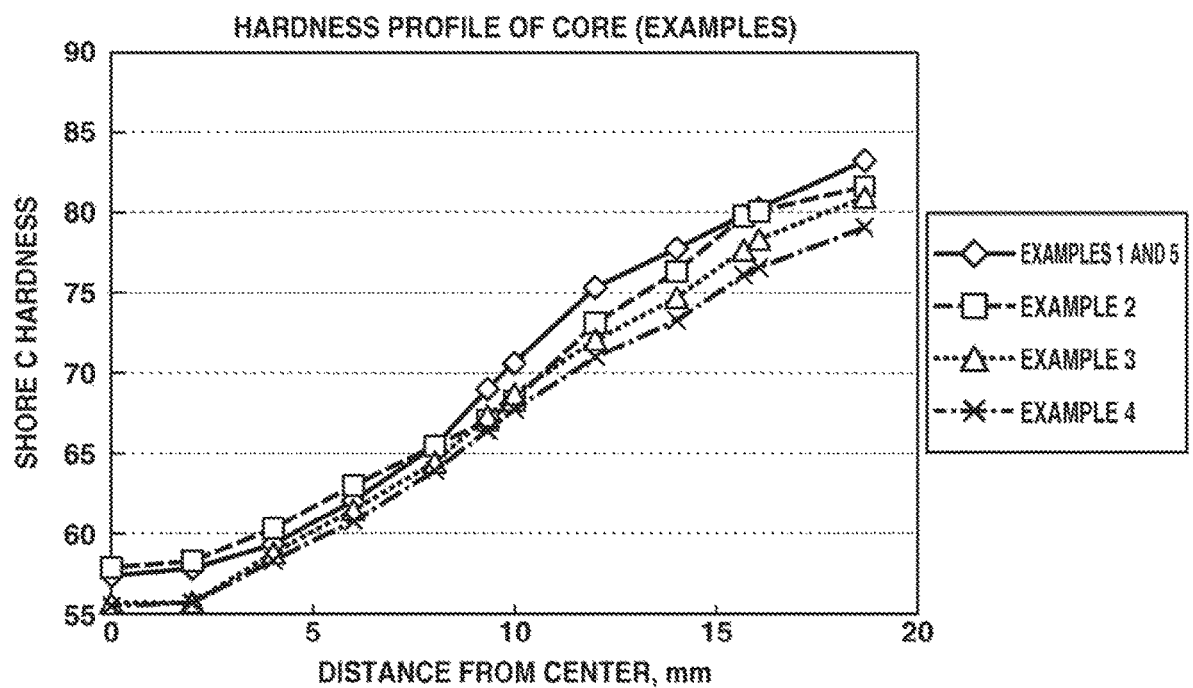
FIG. 2 is a graph showing the hardness profiles of the cores in Examples 1 to 5.
Figure 3:
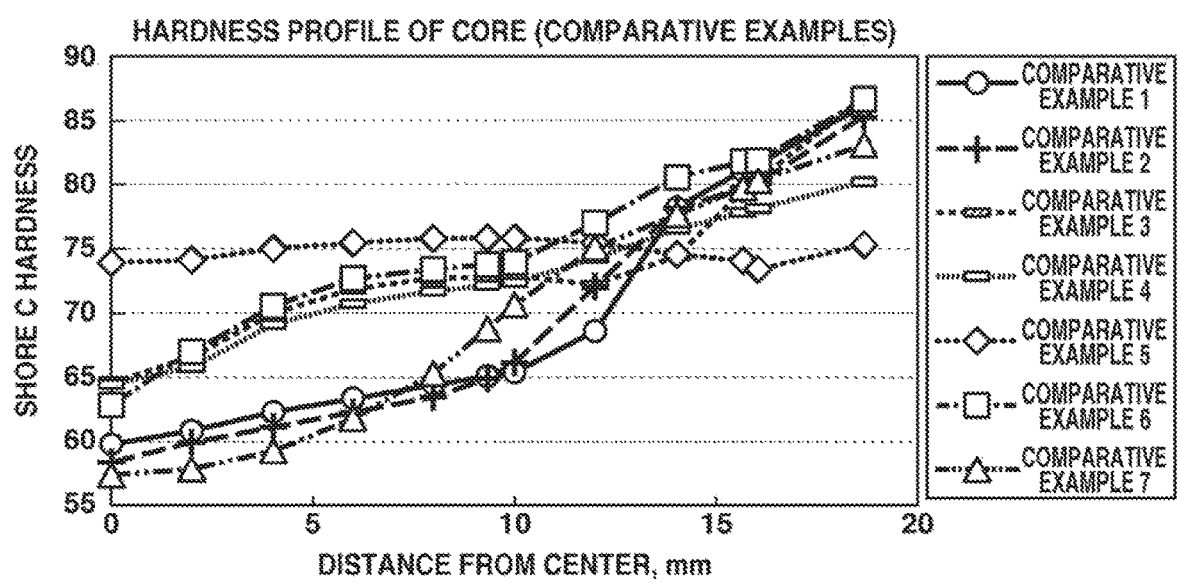
FIG. 3 is a graph showing the hardness profiles of the cores in Comparative Examples 1 to 7.

FIG. 2 shows a graph of the core interior hardness profiles for the balls obtained in Examples 1 to 5, and FIG. 3 shows a graph of the core interior hardness profiles for the balls obtained in Comparative Examples 1 to 7.

Material Hardnesses (Shore C and Shore D Hardnesses) of Intermediate Layer and Cover The resin materials for each of these layers are molded into sheets having a thickness of 2 mm and leave to stand for at least two weeks at a temperature of 23±2° C. Three sheets are stacked together at the time of measurement. The Shore C and Shore D hardnesses of each material are measured using a Shore C durometer and a Shore D durometer in accordance with ASTM D2240. The P2 Automatic Rubber Hardness Tester (Kobunshi Keiki Co., Ltd.) on which a Shore C durometer or a Shore D durometer had been mounted is used for measuring the hardness. The maximum value is read off as the hardness value.

Surface Hardnesses (Shore C and Shore D Hardnesses) of Intermediate Layer-Encased Sphere and Ball The surface hardnesses are measured by perpendicularly pressing an indenter against the surfaces of the respective spheres. The surface hardnesses of the balls (covers) are values measured at dimple-free areas (lands) on the surface of the ball. The P2 Automatic Rubber Hardness Tester (Kobunshi Keiki Co., Ltd.) on which a Shore C durometer or a Shore D durometer had been mounted is used for measuring the hardness. The maximum value is read off as the hardness value.

TABLE 4

| | | Example | | | | | Comparative Example | | | | | | |
|---|---|---|---|---|---|---|---|---|---|---|---|---|---|
| | | 1 | 2 | 3 | 4 | 5 | 1 | 2 | 3 | 4 | 5 | 6 | 7 |
| Ball construction | | 3-piece | 3-piece | 3-piece | 3-piece | 3-piece | 3-piece | 3-piece | 3-piece | 3-piece | 3-piece | 3-piece | 3-piece |
| Core | Diameter (mm) | 37.3 | 37.3 | 37.3 | 37.3 | 37.3 | 37.3 | 37.3 | 37.3 | 37.3 | 37.3 | 37.3 | 37.3 |
| | Weight (g) | 32.0 | 32.0 | 32.0 | 32.0 | 32.0 | 32.0 | 32.0 | 32.0 | 32.0 | 32.0 | 32.0 | 31.7 |
| | Specific gravity | 1.18 | 1.18 | 1.18 | 1.18 | 1.18 | 1.18 | 1.18 | 1.18 | 1.18 | 1.18 | 1.18 | 1.17 |
| | Deflection (mm) | 3.1 | 3.1 | 3.5 | 3.7 | 3.1 | 3.5 | 3.8 | 3.1 | 3.2 | 3.1 | 3.0 | 3.1 |
| Core interior hardness (Shore C) | Surface hardness (Cs) | 83.2 | 81.5 | 80.9 | 79.0 | 83.2 | 86.3 | 85.3 | 86.9 | 80.3 | 75.4 | 86.7 | 83.2 |
| | Hardness at position 16 mm from core center (C16) | 80.1 | 80.0 | 78.3 | 76.5 | 80.1 | 81.7 | 80.3 | 80.6 | 78.2 | 73.4 | 82.0 | 80.1 |
| | Hardness at position 3 mm from core surface (Cs-3) | 79.7 | 79.6 | 77.6 | 75.9 | 79.7 | 81.1 | 79.7 | 79.5 | 77.9 | 74.2 | 81.7 | 79.7 |
| | Hardness at position 14 mm from core center (C14) | 77.6 | 76.3 | 74.7 | 73.2 | 77.6 | 78.2 | 78.2 | 74.3 | 76.6 | 74.6 | 80.6 | 77.6 |
| | Hardness at position 12 mm from core center (C12) | 75.2 | 73.0 | 72.1 | 70.9 | 75.2 | 68.7 | 72.1 | 72.1 | 74.3 | 75.6 | 77.0 | 75.2 |
| | Hardness at position 10 mm from core center (C10) | 70.7 | 68.2 | 68.6 | 67.7 | 70.7 | 65.6 | 66.3 | 72.8 | 72.4 | 75.8 | 74.0 | 70.7 |
| | Hardness at midpoint between core surface and center (Cm) | 68.9 | 67.0 | 67.2 | 66.4 | 68.9 | 65.2 | 65.1 | 72.8 | 72.2 | 75.8 | 73.8 | 68.9 |
| | Hardness at position 8 mm from core center (C8) | 65.4 | 65.4 | 64.4 | 63.8 | 65.4 | 64.6 | 63.6 | 72.8 | 71.7 | 75.7 | 73.5 | 65.4 |
| | Hardness at position 6 mm from core center (C6) | 61.9 | 63.0 | 61.2 | 60.7 | 61.9 | 63.4 | 62.4 | 71.9 | 70.8 | 75.5 | 72.6 | 61.9 |
| | Hardness at position 4 mm from core center (C4) | 59.3 | 60.3 | 58.6 | 58.3 | 59.3 | 62.3 | 61.2 | 70.2 | 69.3 | 75.0 | 70.6 | 59.3 |
| | Hardness at position 2 mm from core center (C2) | 57.9 | 58.2 | 55.7 | 55.7 | 57.9 | 60.9 | 60.0 | 66.6 | 65.9 | 74.2 | 67.0 | 57.9 |
| | Hardness at core center (Cc) | 57.4 | 57.9 | 55.8 | 55.5 | 57.4 | 59.8 | 58.5 | 64.6 | 64.6 | 74.0 | 62.9 | 57.4 |

TABLE 4-continued

|  |  |  | Example | | | | | Comparative Example | | | | | | |
|---|---|---|---|---|---|---|---|---|---|---|---|---|---|---|
|  |  |  | 1 | 2 | 3 | 4 | 5 | 1 | 2 | 3 | 4 | 5 | 6 | 7 |
| Hardness differences between various positions at core interior (Shore C) | Surface hardness - Center hardness (Cs-Cc) | | 25.8 | 23.6 | 15.1 | 23.5 | 25.8 | 26.5 | 26.8 | 22.3 | 15.8 | 1.4 | 23.8 | 2.58 |
| | (Cs-Cm)/(C4-Cc) | | 7.2 | 6.0 | 4.9 | 4.5 | 7.2 | 8.3 | 7.3 | 2.5 | 1.7 | −0.4 | 1.7 | 7.2 |
| | Cs-Cs-3 | | 3.5 | 1.9 | 3.3 | 3.1 | 3.5 | 5.2 | 5.6 | 7.4 | 2.4 | 1.2 | 5.0 | 3.5 |
| | Cs-Cm | | 14.3 | 14.5 | 13.7 | 12.6 | 14.3 | 21.1 | 20.2 | 14.1 | 8.1 | −0.4 | 12.9 | 14.3 |
| | C4-Cc | | 2.0 | 2.4 | 2.8 | 2.8 | 2.0 | 2.5 | 2.8 | 5.6 | 4.7 | 1.0 | 7.7 | 2.0 |
| | C16-C14 | (A7) | 2.5 | 3.7 | 3.6 | 3.3 | 2.5 | 3.5 | 2.1 | 6.2 | 1.6 | −1.2 | 1.4 | 2.5 |
| | C14-C12 | (A6) | 2.4 | 3.3 | 2.6 | 2.3 | 2.4 | 9.5 | 6.1 | 2.2 | 2.3 | −0.9 | 3.6 | 2.4 |
| | C12-C10 | (A5) | 4.6 | 4.8 | 3.4 | 3.2 | 4.6 | 3.1 | 5.8 | −0.6 | 1.9 | −0.3 | 3.0 | 4.6 |
| | C10-C8 | (A4) | 5.2 | 2.8 | 4.2 | 3.9 | 5.2 | 0.9 | 2.7 | 0.0 | 0.7 | 0.1 | 0.5 | 5.2 |
| | C8-C6 | (A3) | 3.5 | 2.4 | 3.2 | 3.1 | 3.5 | 1.2 | 1.2 | 0.9 | 0.9 | 0.3 | 0.9 | 3.5 |
| | C6-C4 | (A2) | 2.6 | 2.7 | 2.6 | 2.4 | 2.6 | 1.1 | 1.2 | 1.7 | 1.5 | 0.5 | 2.0 | 2.6 |
| | C4-C2 | (A1) | 1.5 | 2.1 | 2.9 | 2.6 | 1.5 | 1.5 | 1.2 | 3.6 | 3.4 | 0.8 | 3.5 | 1.5 |
| | C2-Cc | (A0) | 0.5 | 0.3 | −0.1 | 0.2 | 0.5 | 1.1 | 1.6 | 2.0 | 1.3 | 0.2 | 4.1 | 0.5 |
| | A1-A0 | | 1.0 | 1.8 | 3.1 | 2.4 | 1.0 | 0.4 | −0.4 | 1.6 | 2.1 | 0.7 | −0.6 | 1.0 |
| | A2-A1 | | 1.1 | 0.6 | −0.4 | −0.2 | 1.1 | −0.4 | 0.0 | −1.9 | −1.9 | −0.3 | −1.6 | 1.1 |
| | A3-A2 | | 0.9 | −0.3 | 0.7 | 0.7 | 0.9 | 0.2 | 0.0 | −0.7 | −0.6 | −0.2 | −1.1 | 0.9 |
| | A4-A3 | | 1.7 | 0.4 | 1.0 | 0.9 | 1.7 | −0.3 | 1.5 | −1.0 | −0.2 | −0.1 | −0.4 | 1.7 |
| | A5-A4 | | −0.7 | 2.0 | −0.8 | −0.7 | −0.7 | 2.2 | 3.1 | −0.6 | 1.1 | −0.4 | 2.5 | −0.7 |
| | A6-A5 | | −2.2 | −1.5 | −0.8 | −0.9 | −2.2 | 6.3 | 0.3 | 2.8 | 0.4 | −0.7 | 0.6 | −2.2 |
| | A7-A6 | | 0.1 | 0.5 | 1.0 | 1.0 | 0.1 | −6.0 | −3.9 | 4.0 | −0.7 | −0.3 | −2.2 | 0.1 |

TABLE 5

|  |  | Example | | | | | Comparative Example | | | | | | |
|---|---|---|---|---|---|---|---|---|---|---|---|---|---|
|  |  | 1 | 2 | 3 | 4 | 5 | 1 | 2 | 3 | 4 | 5 | 6 | 7 |
| Intermediate layer | Material | I | I | I | I | I | I | I | I | I | I | I | II |
| | Thickness (mm) | 1.90 | 1.90 | 1.90 | 1.90 | 1.90 | 1.90 | 1.90 | 1.90 | 1.90 | 1.90 | 1.90 | 1.90 |
| | Specific gravity | 0.96 | 0.96 | 0.96 | 0.96 | 0.96 | 0.96 | 0.96 | 0.96 | 0.96 | 0.96 | 0.96 | 0.96 |
| | Material hardness (Shore C) | 96 | 96 | 96 | 96 | 96 | 96 | 96 | 96 | 96 | 96 | 96 | 82 |
| | Material Hardness (Shore D) | 65 | 65 | 65 | 65 | 65 | 65 | 65 | 65 | 65 | 65 | 65 | 54 |
| Intermediate layer-encased sphere | Diameter (mm) | 41.1 | 41.1 | 41.1 | 41.1 | 41.1 | 41.1 | 41.1 | 41.1 | 41.1 | 41.1 | 41.1 | 41.1 |
| | Weight (g) | 40.9 | 40.9 | 40.9 | 40.9 | 40.9 | 40.9 | 40.9 | 40.9 | 40.9 | 40.9 | 40.9 | 40.5 |
| | Surface hardness (Shore C) | 100 | 100 | 100 | 100 | 100 | 100 | 100 | 100 | 100 | 100 | 100 | 92 |
| | Surface hardness (Shore D) | 71 | 71 | 71 | 71 | 71 | 71 | 71 | 71 | 71 | 71 | 71 | 62 |
| Intermediate layer surface hardness - Core surface hardness (Shore C) | | 16.9 | 18.5 | 19.1 | 21.0 | 16.9 | 13.7 | 14.7 | 13.2 | 19.7 | 24.6 | 13.3 | 8.6 |
| Cover | Resin material | III | III | III | III | IV | III | III | III | III | III | III | V |
| | Thickness (mm) | 0.80 | 0.80 | 0.80 | 0.80 | 0.80 | 0.80 | 0.80 | 0.80 | 0.80 | 0.80 | 0.80 | 0.80 |
| | Specific gravity | 1.10 | 1.10 | 1.10 | 1.10 | 1.10 | 1.10 | 1.10 | 1.10 | 1.10 | 1.10 | 1.10 | 1.19 |
| | Material hardness (Shore C) | 63 | 63 | 63 | 63 | 70 | 63 | 63 | 63 | 63 | 63 | 63 | 87 |
| | Material hardness (Shore D) | 40 | 40 | 40 | 40 | 45 | 40 | 40 | 40 | 40 | 40 | 40 | 58 |
| Coating layer | Material | I | I | I | I | I | I | I | I | I | I | I | I |
| | Material hardness (Shore C) | 63 | 63 | 63 | 63 | 63 | 63 | 63 | 63 | 63 | 63 | 63 | 63 |
| Ball | Diameter (mm) | 42.7 | 42.7 | 42.7 | 42.7 | 42.7 | 42.7 | 42.7 | 42.7 | 42.7 | 42.7 | 42.7 | 42.7 |
| | Weight (g) | 45.5 | 45.5 | 45.5 | 45.5 | 45.5 | 45.5 | 45.5 | 45.5 | 45.5 | 45.5 | 45.5 | 45.5 |
| | Surface hardness (Shore C) | 82 | 82 | 82 | 82 | 87 | 82 | 82 | 82 | 82 | 82 | 82 | 95 |
| | Surface hardness (Shore D) | 56 | 56 | 56 | 56 | 59 | 56 | 56 | 56 | 56 | 56 | 56 | 66 |
| Ball surface hardness - Intermediate layer surface hardness (Shore C) | | −18 | −18 | −18 | −18 | −13 | −18 | −18 | −18 | −18 | −18 | −18 | 3 |
| Material hardness of coating layer - Material hardness of cover (Shore C) | | 0 | 0 | 0 | 0 | −7 | 0 | 0 | 0 | 0 | 0 | 0 | −23.8 |
| Material hardness of coating layer - Center hardness of core (Shore C) | | 5.7 | 5.1 | 7.2 | 7.5 | 5.7 | 3.2 | 4.5 | −1.6 | −1.6 | −11.0 | 0.1 | 5.7 |

TABLE 5-continued

|  | Example | | | | | Comparative Example | | | | | | |
| --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 |
| Cover thickness + Intermediate layer thickness (mm) | 2.7 | 2.7 | 2.7 | 2.7 | 2.7 | 2.7 | 2.7 | 2.7 | 2.7 | 2.7 | 2.7 | 2.7 |
| Intermediate layer thickness − Cover thickness (mm) | 1.10 | 1.10 | 1.10 | 1.10 | 1.10 | 1.10 | 1.10 | 1.10 | 1.10 | 1.10 | 1.10 | 1.10 |

The flight performance (W #1 and I #6), spin rate on approach shots, scuff resistance and durability to cracking on repeated impact of each golf ball are evaluated by the following methods. The results are shown in Table 6.

Flight Performance (W #1)

A driver (W #1) is mounted on a golf swing robot and the distance traveled by the ball when struck at a head speed of 50 m/s is measured and rated according to the criteria shown below. The club used is the TourB XD-5 (2016 model) manufactured by Bridgestone Sports Co., Ltd. In addition, using an apparatus for measuring the initial conditions, the spin rate is measured immediately after the ball was similarly struck.

Rating Criteria
Good: Total distance is 254.0 or more
NG: Total distance is 253.9 m or less Flight Performance (I #6)

A middle iron (I #6) is mounted on a golf swing robot and the distance traveled by the ball when struck at a head speed of 37 m's is measured and rated according to the criteria shown below. The club used is the TourB X-CB (2016 model) manufactured by Bridgestone Sports Co., Ltd. In addition, using an apparatus for measuring the initial conditions, the spin rate is measured immediately after the ball is similarly struck.

Rating Criteria
Good: Total distance is 174.5 or more
NG: Total distance is 174.4 m or less Evaluation of Spin Rate on Approach Shots A sand wedge (SW) is mounted on a golf swing robot and the amount of spin by the ball immediately after being struck at a head speed of 21 m/s is measured using an apparatus for measuring the initial conditions and rated according to the criteria shown below. The sand wedge (SW) is the Tour B XW-1 manufactured by Bridgestone Sports Co., Ltd.

Rating Criteria:
Good: Spin rate is 6.000 rpm or more
NG: Spin rate is less than 6,000 rpm Scuff Resistance A wedge having a loft angle of 52° and square grooves etched into the clubface is mounted on a golf swing robot, and the scuff resistance of the ball when struck at a head speed (HS) of 40 m/s is rated according to the following criteria.

Rating Criteria:
Good: The resistance to scuffing is comparable to or better than that of the ball in Example 1
NG: Scuffing is more pronounced than in Example 1

Durability to Cracking on Repeated Impact

Ten sample balls (N=10) for each Example are repeatedly struck with a driver (W #1) at ahead speed of 45 m/s and the durability is rated as follows. The number of shots after which a ball began to crack is counted for each of the ten balls. Of these balls, the three balls having the lowest number of shots on cracking are selected and the average number of shots on cracking for these three balls is treated as the "number of shots on cracking" for that Example. Durability indexes are determined for each Example based on a durability index of 100 for the number of shots on cracking in Example 4.

Rating Criteria:
Good: Durability index is 80 or more
NG: Durability index is less than 80

TABLE 6

| | | Example | | | | | Comparative Example | | | | | | |
| --- | --- | --- | --- | --- | --- | --- | --- | --- | --- | --- | --- | --- | --- |
| | | 1 | 2 | 3 | 4 | 5 | 1 | 2 | 3 | 4 | 5 | 6 | 7 |
| Flight (1) (W#1: HS = 50 m/s) | Spin rate (rpm) | 2,626 | 2,642 | 2,551 | 2,540 | 2,576 | 2,548 | 2,535 | 2,745 | 2,732 | 2,914 | 2,766 | 2,618 |
| | Total distance (m) | 256.5 | 255.9 | 254.3 | 254.0 | 257.1 | 255.4 | 254.3 | 254.7 | 252.6 | 252.2 | 254.6 | 254.5 |
| | Rating | good | good | good | good | good | good | good | good | NG | NG | good | good |
| Flight (2) (I#6: HS = 44 m/s) | Spin rate (rpm) | 5,156 | 5,186 | 4,925 | 4,823 | 5,003 | 5,058 | 4,871 | 5,297 | 5,294 | 5,504 | 5,223 | 5,255 |
| | Total diance (m) | 175.5 | 174.6 | 176.5 | 176.7 | 176.7 | 176.9 | 176.6 | 174.2 | 174.1 | 173.2 | 171.7 | 174.3 |
| | Rating | good | good | good | good | good | good | good | NG | NG | NG | NG | NG |
| Distance (overall assessment) | Sum of (1) + (2) (m) | 431.9 | 430.5 | 430.8 | 430.7 | 433.8 | 432.3 | 430.9 | 428.9 | 426.7 | 425.4 | 426.3 | 428.8 |
| | Rating | good | good | good | good | good | good | good | NG | NG | NG | NG | NG |
| Spin performance on approach shots (HS = 21 m/s) | Spin rate (rpm) | 6,374 | 6,368 | 6,222 | 6,134 | 6,197 | 6,222 | 6,110 | 6,356 | 6,309 | 6,230 | 6,258 | 5,795 |
| | Rating | good | good | good | good | good | good | good | good | good | good | good | NG |
| Scuff resistance | Rating | good | good | good | good | good | good | good | good | good | good | good | NG |
| Durability to repeated impact | Rating | good | good | good | good | good | NG | NG | good | good | good | good | good |

As demonstrated by the results in Table 6, the golf balls of Comparative Examples 1 to 7 are inferior in the following respects to the golf balls according to the present invention that are obtained in the Examples.

In Comparative Example 1, the (Cs−Cs-3) value in the core hardness profile is larger than 5.0 and the (C14−C12) value is larger than 5.5. As a result, the ball has a poor durability to cracking on repeated impact.

In Comparative Example 2, the (Cs−Cs-3) value in the core hardness profile is larger than 5.0 and the (C14−C12) value is larger than 5.5. As a result, the ball has a poor durability to cracking on repeated impact.

In Comparative Example 3, the (Cs−Cm)/(C4−Cc) value in the core hardness profile is smaller than 4.0, the (Cs−Cs-3) value in the core hardness profile is larger than 5.0 and the (C16−C14) value is larger than 5.5. As a result, the spin rate of the ball on full shots rose and the initial velocity on shots is low, and so the distance is poor.

In Comparative Example 4, the core surface hardness−core center hardness (Cs−Cc) value in the core hardness profile is smaller than 22 and the (Cs−Cm)/(C4−Cc) value is smaller than 4.0. As a result, the spin rate of the ball on full shots rose and so the distance is poor.

In Comparative Example 5, the core surface hardness−core center hardness (Cs−Cc) value in the core hardness profile is smaller than 22 and the (Cs−Cm)(C4−Cc) value is smaller than 4.0. As a result, the spin rate of the ball on full shots rose and so the distance is poor.

In Comparative Example 6, the (Cs−Cm)/(C4−Cc) value in the core hardness profile is smaller than 4.0 and the (C2−Cc) value is larger than 4.0. As a result, the spin rate of the ball on full shots rose and so the distance is poor.

In Comparative Example 7, the surface hardness (Shore D) of the ball is higher than the surface hardness of the intermediate layer-encased sphere. As a result, the spin rate of the ball on approach shots is inadequate and the scuff resistance is poor. Moreover, the intermediate layer is formed of a soft material, as a result of which the spin rate on full shots with an iron (I #6) rose and so the distance is poor.

Japanese Patent Application No. 2019-188476 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a core, an intermediate layer and a cover, wherein the core is formed primarily of a base rubber and has a diameter of at least 32 mm, the intermediate layer and the cover are each formed of a resin material, the core has an internal hardness which is such that, letting Cc be the Shore C hardness at a center of the core, C2 be the Shore C hardness at a position 2 mm from the core center, C4 be the Shore C hardness at a position 4 mm from the core center, C6 be the Shore C hardness at a position 6 mm from the core center, C8 be the Shore C hardness at a position 8 mm from the core center, C10 be the Shore C hardness at a position 10 mm from the core center, C12 be the Shore C hardness at a position 12 mm from the core center, C14 be the Shore C hardness at a position 14 mm from the core center, C16 be the Shore C hardness at a position 16 mm from the core center, Cs be the Shore C hardness at a surface of the core, Cs-3 be the Shore C hardness at a position 3 mm inside the core surface and Cm be the Shore C hardness at a position midway between the core surface and the core center, the values of C8−C6, C6−C4, C4−C2 and C2−Cc are all 4.0 or less and the values of C16−C14, C14−C12, C12−C10 and C10−C8 are all 5.5 or less, and which satisfies formulas (1), (2) and (3) below $$Cs - Cc \geq 22 \tag{1}$$

$$(Cs - Cm)/(C4 - Cc) \geq 4.0 \tag{2}$$

$$Cs - Cs\text{-}3 \leq 5.0 \tag{3};$$

and the sphere obtained by encasing the core with the intermediate layer (intermediate layer-encased sphere) has a Shore C surface hardness and the ball has a Shore C surface hardness which satisfy the following relationship:

$$\text{surface hardness of ball} < \text{surface hardness of intermediate layer-encased sphere} \tag{4},$$

and wherein the core is formed of a rubber composition comprising:
(a) a base rubber,
(b) a co-crosslinking agent that is an α,β-unsaturated carboxylic acid or a metal salt thereof or both,
(c) a crosslinking initiator, and
(d) a lower alcohol having a molecular weight of less than 200.

2. The golf ball of claim 1, wherein the core consists of a single layer.

3. The golf ball of claim 1, wherein a coating layer is formed on a surface of the cover and, letting Hc be the Shore C hardness of the coating layer, the difference Hc−Cc between Hc and the Shore C hardness Cc at the core center is at least −12 and not more than 20.

4. The golf ball of claim 1, wherein the content of component (d) is from 0.5 to 5 parts by weight per 100 parts by weight of the base rubber (a).

5. The golf ball of claim 1, wherein component (d) is a monohydric, dihydric or trihydric alcohol.

6. The golf ball of claim 1, wherein component (d) is butanol, glycerol, ethylene glycol or propylene glycol.

* * * * *